Figure 11:
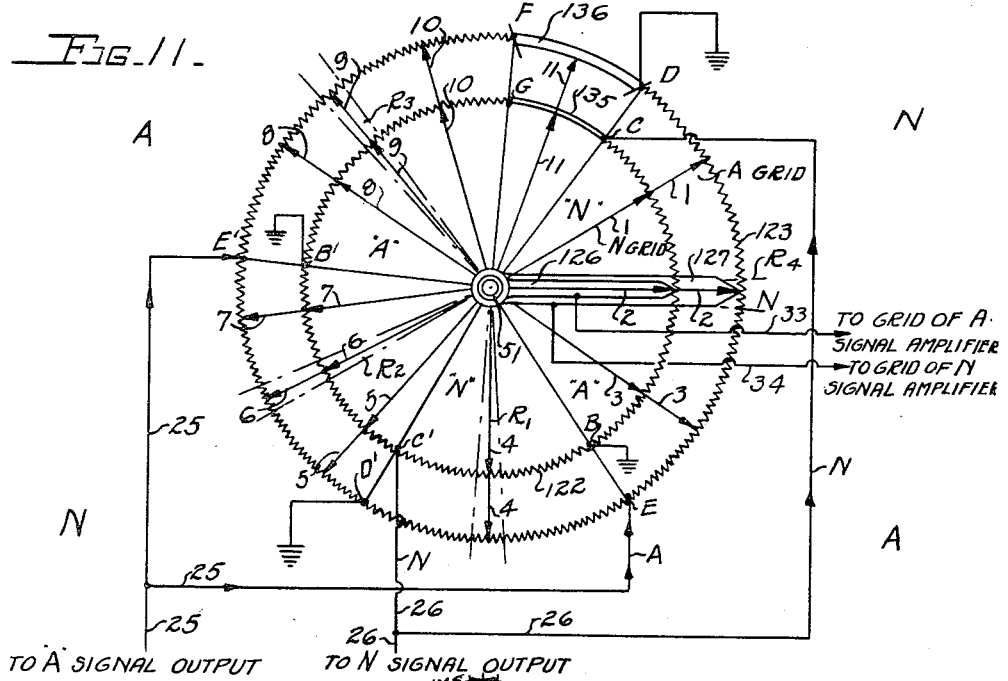

March 23, 1948. C. W. MULLER 2,438,126
MECHANICAL SIGNAL AND VOLUME CONTROL FOR MINIATURE RADIO RANGES
Filed Feb. 17, 1940 6 Sheets-Sheet 1
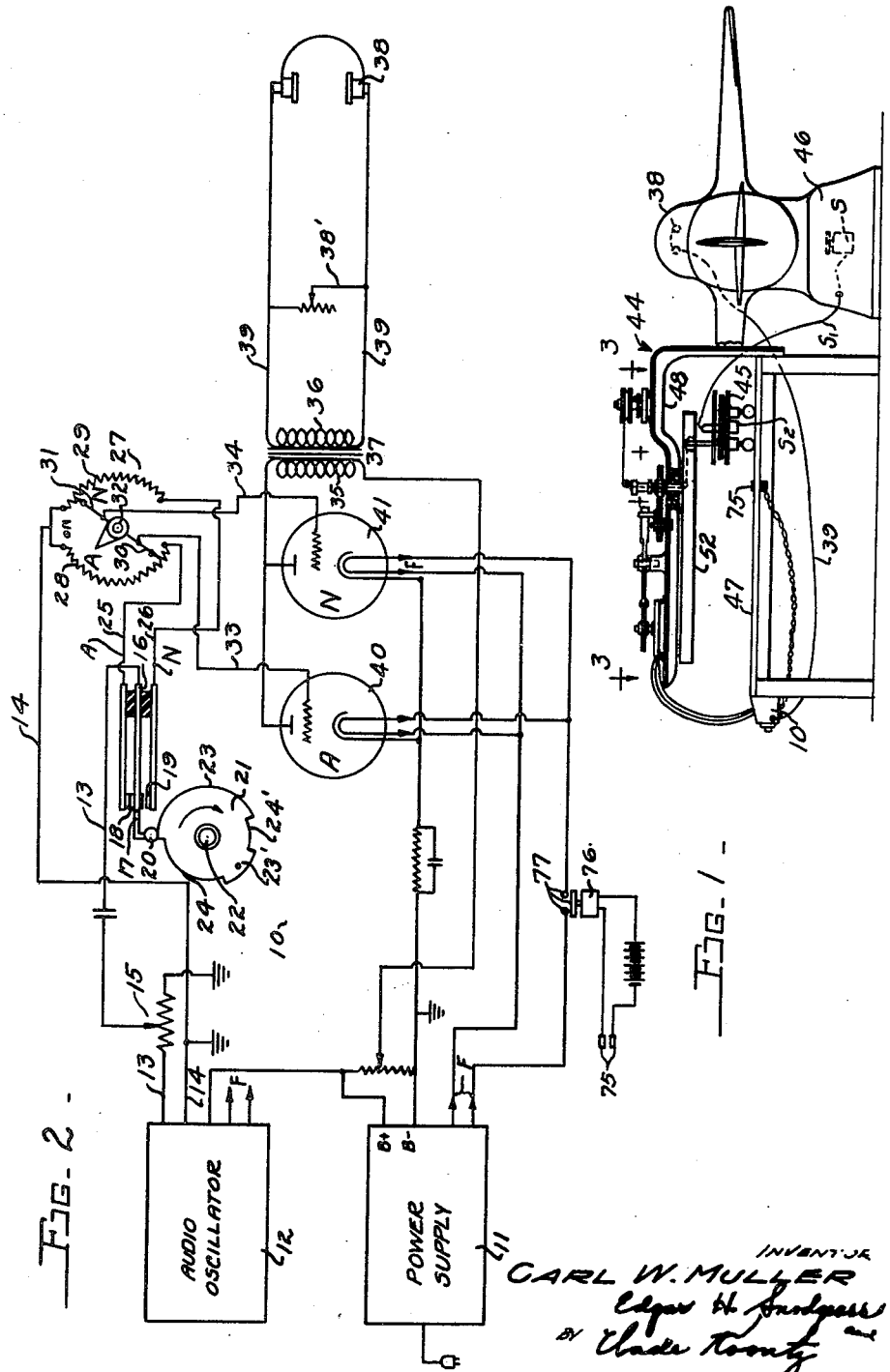
INVENTOR
CARL W. MULLER
ATTORNEYS

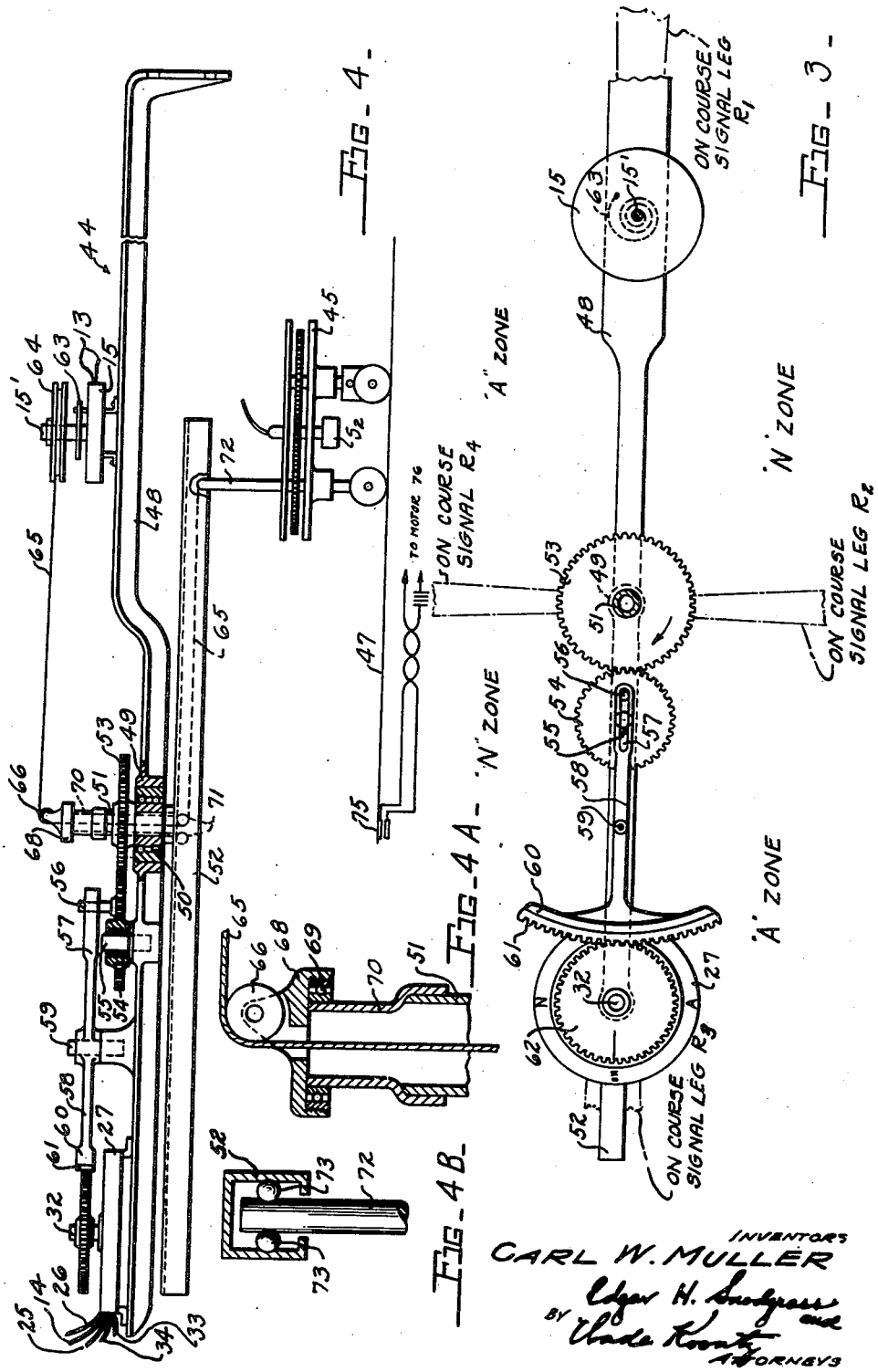
March 23, 1948.  C. W. MULLER  2,438,126
MECHANICAL SIGNAL AND VOLUME CONTROL FOR MINIATURE RADIO RANGES
Filed Feb. 17, 1940  6 Sheets-Sheet 2

March 23, 1948. C. W. MULLER 2,438,126
MECHANICAL SIGNAL AND VOLUME CONTROL FOR MINIATURE RADIO RANGES
Filed Feb. 17, 1940 6 Sheets-Sheet 3
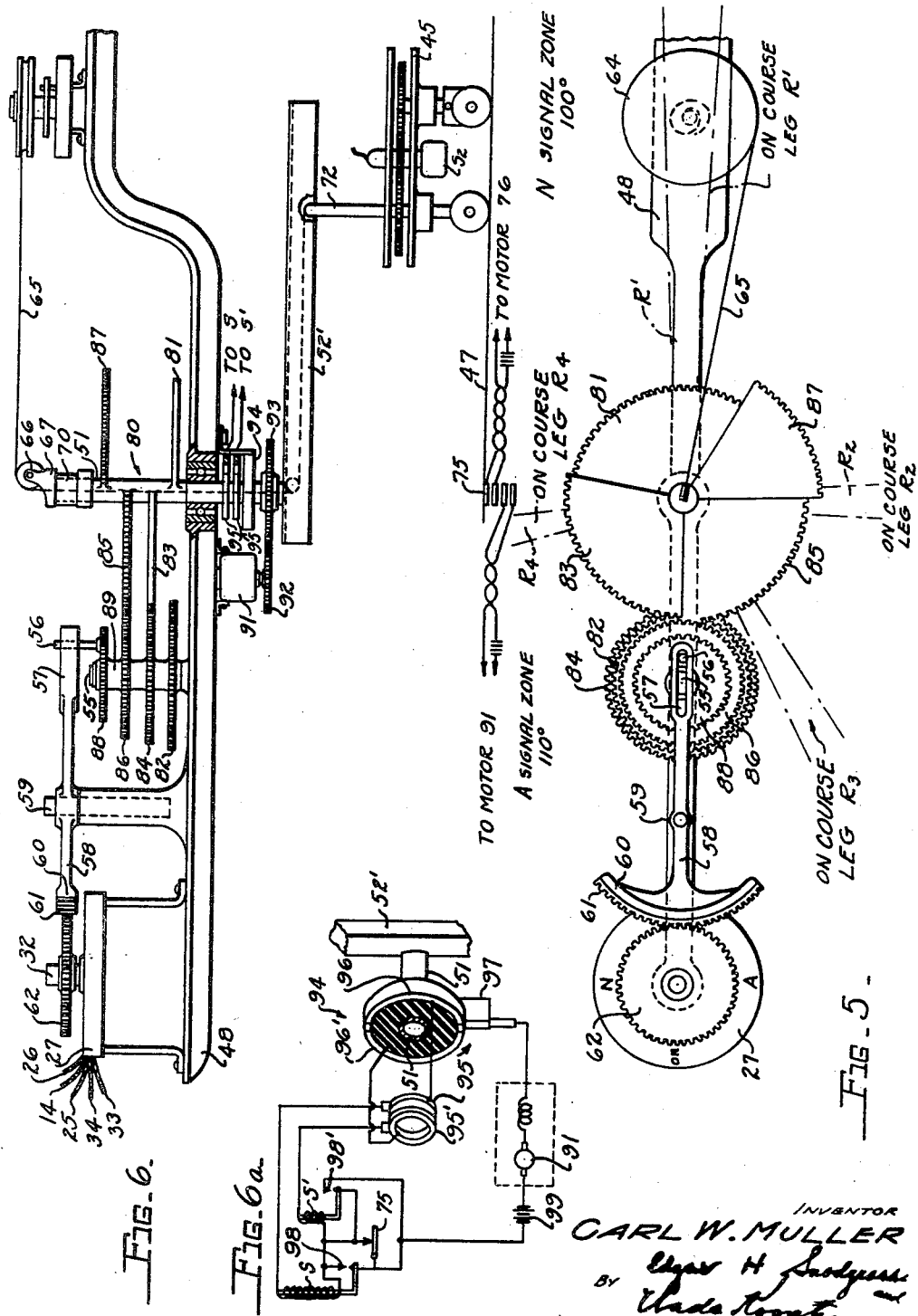

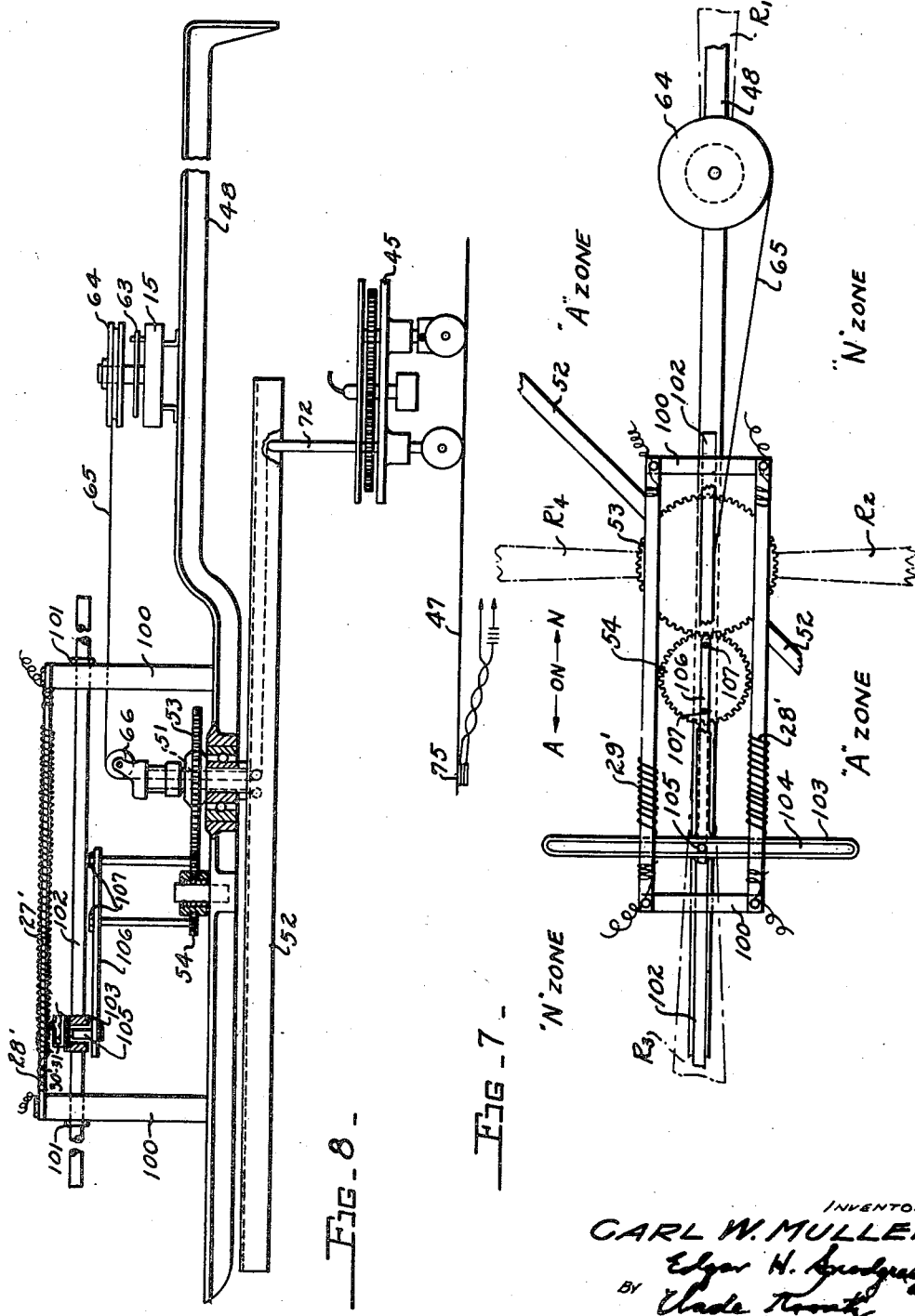

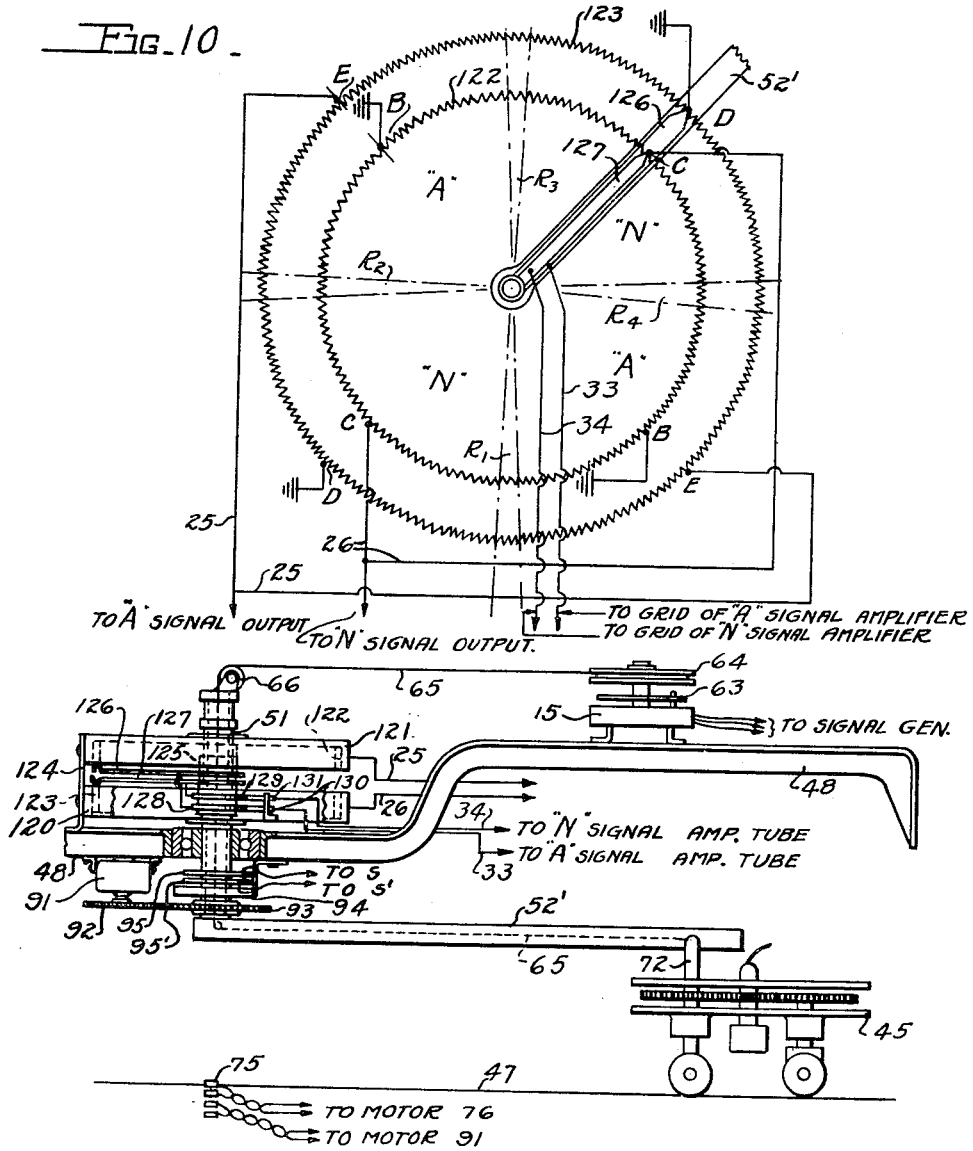

March 23, 1948.    C. W. MULLER    2,438,126
MECHANICAL SIGNAL AND VOLUME CONTROL FOR MINIATURE RADIO RANGES
Filed Feb. 17, 1940    6 Sheets-Sheet 6

INVENTOR
CARL W. MULLER

Patented Mar. 23, 1948

2,438,126

UNITED STATES PATENT OFFICE 2,438,126

MECHANICAL SIGNAL AND VOLUME CONTROL FOR MINIATURE RADIO RANGES

Carl W. Muller, Osborn, Ohio

Application February 17, 1940, Serial No. 319,498

14 Claims. (Cl. 35—10)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a mechanical means for operating an electrical signalling system and more particularly relates to a mechanical means for operating a simulated miniature radio range signalling system, for use in conjunction with aviation ground trainers.

In order to reduce the time and expense of training aviators in instrument flying, aviation ground trainers have gone into extensive use and generally comprise a grounded trainer, controllable in a manner simulating a full size aeroplane in flight. A course recorder is used in conjunction with such a trainer, to plot the simulated flight of the trainer on a record map sheet. The course recorder is adapted to be propelled over the record surface at a velocity proportional to the simulated velocity in flight of the trainer and the movement of the course recorder is directionally controlled by an electric transmission linkage in accordance with the directional heading of the trainer. For more detailed description of the construction of one type of aviation ground trainer known as the "Link" trainer, reference may be had to United States Patents No. 1,825,462 and No. 2,099,857 granted to Edwin A. Link, Jr., and for a detailed description of a recorder suitable for use with such trainers, reference may be had to United States Patents No. 1,293,747, granted to Hannibal C. Ford and No. 2,179,663, granted to Edwin A. Link, Jr.

In order to simulate instrument flying on a radio range, it is customary to provide a manually controlled electric signalling system operated by an instructor, who watches the progress of the course recorder over a record map having the conventional radio range "A," "N" and "On course" signal zones drawn thereon and radiating from a point representing a radio range transmitting station. The signal system is provided with a control, which when in one position is mechanically keyed to give the familiar radio range "A" or dot-dash signal in headphones worn by the student, when the control is placed in a second position the "N" or dash-dot signal is heard in the headphones and when the control is placed in a third position the "A" and "N" signals are blended to give a continuous hum representing the "On course" signal. The signal system is provided with a keying means, whereby the "A" and "N" signals are suppressed and a station call signal is transmitted to the headphones, worn by the student. The instructor actuates the signal control, so that the proper signal is given to the student, dependent on the location of the trainer course recorder on the record map, relative to the various signal quadrants and the instructor also actuates a signal volume control in accordance with the distance of the recorder from the assumed broadcasting station and in accordance with the direction of movement of the recorder. The signal volume is controlled by watching the position of the recorder relative to concentric circles drawn on the record map with the assumed broadcasting station as a center and indicative of the radial distance from the broadcasting station. When the recorder marker element is approaching the assumed destination, the signal volume must be increased gradually toward a maximum and when close to the station, the signal must be cut off to indicate the cone of silence and the signal volume again turned on, as the recorder moves out of the cone of silence onto another range leg. For a detailed description of one form of manually controlled signalling system, adapted for use with an aviation ground trainer, reference may be had to United States Patent No. 2,119,083, granted to Edwin A. Link, Jr.

In giving instruction on an aviation ground trainer, the result attained is definitely affected by the accuracy in operation of the signal and volume controls, on the radio range signalling system, by the instructor and frequent errors in manipulating the signalling system, cause the student to lack confidence in the training system. The invention proposes to eliminate the personal factor in operating a radio range signalling system, by operating the signal and volume controls mechanically, dependent on the position of the course recorder relative to the simulated radio range transmitter station point on the record map. The recorder is mechanically connected to actuate both the signal control and volume control of the signalling system, so that a position of the recorder, either to the right, or left of a radio range "On course" signal zone, will cause the signalling system to transmit the proper "A" or "N" signal, to the student and to transmit the continuous "On course" signal, as long as the recorder remains on the "On course" signal leg on the record map and to automatically vary the signal volume, as the recorder moves towards or away from the radio range transmitting station point, on the record map.

The invention also provides means for mechanically actuating the radio range signalling system of the type above described, where the angle between two or more adjacent radio range "On course" signal legs is other than ninety degrees.

The invention also provides a means to interrupt the transmission of signals, as the simulated cone of silence zone, surrounding the radio range transmitter station point on the record map, is traversed by the course recorder and to reestablish the signals with proper sign and volume, when the recorder moves out of the cone of silence zone.

It is an object of this invention to provide, in combination with an aviation ground trainer and course recorder, an electric radio range signalling system controlled by the position of the course recorder, relative to a predetermined radio range course on a record surface, traversed by the said recorder.

A further object of the invention is the provision of a mechanical means operated by the course recorder of an aviation ground trainer, for controlling the generation of signals of a definite character and volume, transmitted to said trainer, to simulate radio range signals.

A further object of the invention is the provision of means actuated by an aviation ground trainer course recorder for controlling the character of signal generated by a simulated miniature radio range signalling system, used in conjunction with said recorder.

A further object of the invention is the provision of means actuated by an aviation ground trainer course recorder for automatically varying the signal volume control on a simulated radio range signalling system, used in conjunction with said trainer course recorder, for the transmission of positional information.

A further object of the invention is the provision of a means actuated by an aviation ground trainer course recorder for interrupting the generation of simulated radio range signals, in accordance with a predetermined position of the trainer course recorder, relative to a simulated cone of silence zone on the recorder record sheet.

A further object of the invention is the provision of a means to automatically operate a simulated radio range signalling system for an aviation ground trainer, by a course recording means for said trainer, in a manner to simulate a radio range having signal zones of unequal angular extent in azimuth.

Figure 12:
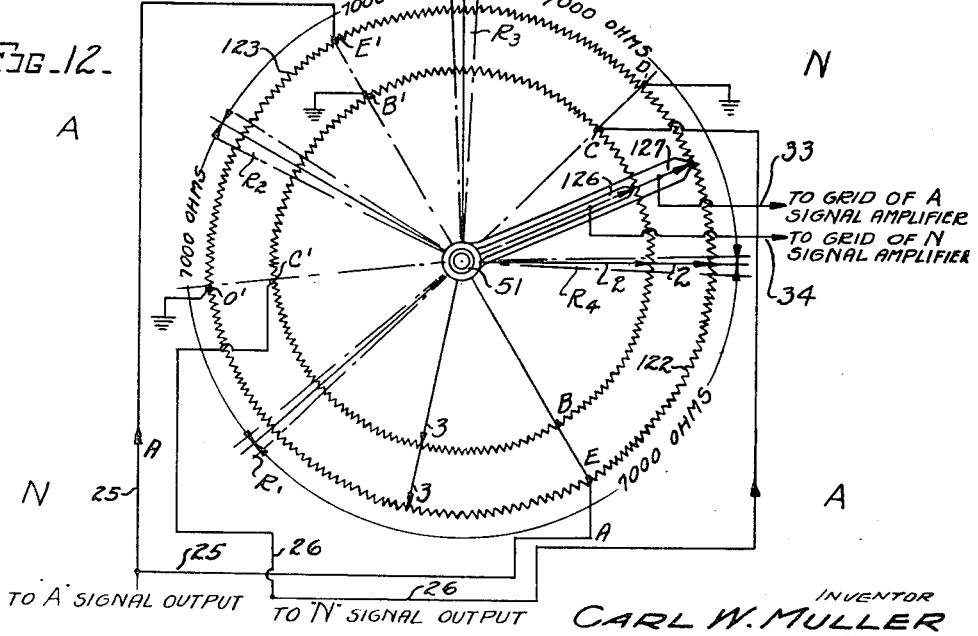

Other objects of the invention will become apparent by reference to the detailed description hereinafter given and to the appended drawings in which:

Fig. 1 illustrates an elevation of the general assembly of elements comprising the automatic mchanically controlled signal system according to the invention; and Fig. 2 illustrates a portion of a well-known radio range signal generator used in conjunction with aviation ground trainers; and Fig. 3 illustrates a top plan view of the mechanical signal and volume control taken on line 3—3 of Fig. 1; and Fig. 4 is a side elevation of the mechanical signal and volume control device illustrated in Fig. 1; and Figs. 4A and 4B illustrate details of the device of Fig. 1; and Fig. 5 is a top plan view of a modified form of the device of Fig. 1 in which variable ratio gearing is employed; and Fig. 6 is a side elevation of the device illustrated in Fig. 5; and Fig. 6A is an illustration of the electric servomotor circuit employed in the device of Figs. 5 and 6; and Fig. 7 is a top plan view of a modified form of the device of Fig. 1 in which a straight slide potentiometer is employed; and Fig. 8 is a side elevation of the device illustrated in Fig. 7; and Fig. 9 is a side elevation of a modified form of the device of Fig. 1 in which the signal control potentiometer is directly actuated without the use of gearing; and Fig. 10 is a schematic illustration of the potentiometer arrangement in the device of Fig. 9; and Fig. 11 is a schematic illustration of a modified form of potentiometer for the device of Fig. 9 where the radio range, "On course," signal legs form angles differing from ninety degrees; and Fig. 12 is a schematic illustration of another form of potentiometer for the device of Fig. 9, for use where the radio range, "On course," signal legs form angles differing from ninety degrees.

As seen in Fig. 1, the principal components of the invention comprise, an aviation ground trainer 46, of the type described, directionally controlling a course recorder 45, by means of the Selsyn transmitter S, electrically connected by conductors $S_1$, to a Selsyn receiver $S_2$, geared to the recorder rollers to control their directional planes, also well-known in the art, a record table 47, upon which the recorder operates to actuate a mechanical apparatus generally indicated at 44, which in turn controls an electric signal generator 10, of known type, to transmit signals to headphones 38, adapted to be worn by the student in the trainer cockpit. The signals received in the trainer cockpit are of a character, such as to give positional information of the location of the course indicator 45, relative to an assumed radio range on the surface of the record table 47. The switch 75, is actuated by the recorder 45, to indicate the passing of the recorder into the simulated cone of silence on the assumed radio range.

The details of the signal system and the means for actuating the signal generator by the recorder, is specifically illustrated in Figs. 2 to 12 inclusive and hereinafter described.

In Fig. 2 there is illustrated a known form of signal generator, for generating radio range signals and adapted to be manually controlled, both as to the character of signal generated and as to signal volume. The construction of the signal generator per se, forms no part of the present invention, being a part of a manually controlled signalling system employed in the art in conjunction with aviation ground trainers, for instruction on radio range flying.

The signal generator is generally indicated by the reference numeral 10 and comprises a power supply unit 11, adapted to be connected to any suitable alternating current supply (not shown). The power supply unit 11, incorporates a full wave alternating current rectifier supplying a filtered high voltage direct current to the positive and negative leads, indicated respectively as B+ and B—. The power supply 11, also is provided with suitable low voltage alternating current conductors F, for supplying the cathode heater filaments of the various vacuum tubes employed. The various cathode heater connections are also indicated by the reference character F.

The positive high voltage conductor B+, of the power supply, is connected to an audio oscillator 12, of well-known construction and which has output leads 13 and 14 respectively. The audio oscillator lead 13, has connected in series therein a variable volume control potentiometer 15 and the lead 13 then connects to a cam actuated flexible switch arm 16 having a double contact 17 thereon, which can engage a contact 18, when moved upward, or engage a contact 19, when moved downward. The switch arm 16 is actuated by a cam follower 20, which engages a cam 21, driven in a clockwise direction by a constant speed shaft 22. The cam 21 is cut with a raised sector portion 23 of considerable length and a short raised sector portion 23', so that the long raised portion 23 causes the follower 20 to be raised to form a contact between contact points 17 and 18, for a sufficient time to form a dash signal, while the raised portion 23' causes follower 20 to close contacts 17 and 18 for a shorter period of time to form a dot signal. The cam 21 is cut with arcuate depressed portions 24 and 24', which respectively allow the follower 20 to drop, closing contacts 17 and 19, to cause a dash and dot signal respectively. The cam 21, as it rotates clockwise, causes its raised portion 23' to form a dot signal, followed by a dash signal, due to engagement of the follower 20 by the raised portions 23' and 23 of the cam, forming a dot-dash, or "A" signal, in the conductor 25 connected to contact 18. The cam depressions 24 and 24' sequentially cause the follower 20 and contacts 17 and 19 to form a dash-dot, or "N" signal, in the conductor 26 connected to the contact point 19. The cam 21, is so cut and rotated at such a speed that there is no appreciable time interval between the signals, and when the signals are of equal strength the aural illusion of a continuous tone will be heard.

A potentiometer generally indicated as 27, has a resistance winding 28 connected to the conductor 25 and a resistance winding 29 connected to the conductor 26. At their outer ends, each of the resistances 28 and 29 is connected to the output lead 14 of the oscillator 12. A movable contact arm 30, engages the resistor 28 and a similar arm 31 engages the resistor 29 and a shaft 32 actuates the contact arms 30 and 31, so that as resistance 28 is increased, the resistance 29 is decreased and vice versa. The contact arm 30 is connected by a lead 33 to the grid of a triode amplifier tube 40 of the cathode heater type and the contact arm 31 is similarly connected by means of a conductor 34 with the grid of a second triode amplifier tube 41, similar to tube 40. The plates of the amplifier tubes 40 and 41 are connected to the primary winding 35 of a coupling transformer 37, which in turn is connected to the positive terminal (B+) of the power supply through a suitable voltage divider. The cathodes of the tubes 40 and 41, are each connected to the negative terminal (B—) of the power supply through a suitable resistance. The secondary winding 36 of the coupling transformer 37 is connected in series with a telephone receiver headset 38 by leads 39 and a suitable volume adjusting rheostat 38' may be shunted across the receivers 38.

In operation the audio oscillator 12, generates a continuous audio frequency current in the conductor 13, which current is alternately led to the amplifier tubes 40 and 41 by the keying contacts 17, 18 and 19 in a manner determined by cam 21, such that tube 40 produces an amplified, audible, dot-dash, or "A" signal in the headphones 38 and the tube 41 produces an amplified, audible, dash-dot, or "N" signal in the headphones. With the potentiometer 27 adjusted to the position indicated as "on," the resistances 28 and 29 may be so wound that only a small resistance is introduced in series with the grids of the tubes 40 and 41 and due to a slight overlap on the cam 21 a practically continuous signal will be heard in the headphones corresponding to the well-known continuous "On course" radio range signal. When the potentiometer 27 is adjusted to the position indicated as A, the portion of the resistance 28 inserted in series with the grid of the A tube 40, will be a minimum, while the portion of the resistance 29 inserted in series with the grid of the N tube 41, will be a maximum, so that only the "A" signal will be heard in the headphones 38, the "N" signal being suppressed into the background. If the potentiometer 27 is adjusted to the N position, the resistance 28 inserted in series with the tube 40 is increased and the resistance 29 inserted in series with the tube 41 is decreased, so that the "N" signal is heard in the headphones, the "A" signal being suppressed into the background. Thus by proper manipulation of the potentiometer 27, the "A," "N," or "On course" signals of a radio range may be simulated at will. To control the signal volume, the potentiometer 15 is actuated to increase or decrease the resistance inserted in the audio oscillator output lead 13. A signal cutoff switch 75 is inserted in the filament circuit F and its function will be later described.

The signalling system above described, in actual practice also includes additional circuits permitting station call signals, marker beacon signals and interphone communication between the instructor and student, as well as the radio range signals, but such additional circuits have no bearing on the present invention and accordingly have not been illustrated.

Figs. 3 and 4, illustrate the details of one form of automatic mechanical means generally indicated by the reference numeral 44 (Fig. 1), for actuating the potentiometers 15 and 27, of the signalling system illustrated in Fig. 2, in accordance with the position of an aviation ground trainer recorder, relative to a simulated predetermined radio range signal pattern outline laid out on the record table map. The device comprises an aviation ground trainer course recorder, or indicator 45, which is adapted to be directionally controlled by the trainer 46 and to be propelled over the surface of the map table 47 at a velocity proportional to the simulated velocity in flight of the trainer as previously described with reference to Fig. 1. A light cast metal frame 48, is rigidly mounted on a support as indicated in Fig. 1 so as to overlie in substantially a parallel relation, the surface 47, of the record map table. The frame 48 is provided with an enlarged boss 49 suitably bored to receive a ball bearing 50, which rotatably journals a vertical hollow shaft 51, whose axis is arranged to intersect the surface of the table 47 at a point equivalent to the location of the radio range transmission station on a radio range map placed on the table surface. A small U-shaped channel member 52 is secured to the lower end of the shaft 51 and arranged in parallel spaced relation to the record surface 47. A gear 53 is mounted on the upper end of the shaft 51 and meshes with a gear 54 rotatably mounted by means of a ball type bearing on a spindle 55, suitably secured in a boss on frame 48. The gear 53 is designed to have twice the number of teeth as gear 54, so that gear 54 will make two revolutions to every one revolution of gear 53. The gear 54 carries an eccentrically mounted pin 56, which is adapted to slide in a crosshead slot 57 in one end of a lever 58 rotatably mounted on a spindle 59 carried by frame 48. The other end of the lever 58 carries a gear sector 60 provided with gear teeth 61, which mesh with a gear 62. The gear 62 is mounted on the shaft 32 of a potentiometer 27. The windings 28 and 29 and conductors 14, 25, 26, 33 and 34 connect to a signalling system in the manner shown in Fig. 2.

A volume control potentiometer 15 is mounted on the frame 48 and its shaft 15' is biased by a light coiled hair spring 63, so as to rotate the shaft 15' in the direction to introduce a maximum resistance in the audio oscillator output circuit conductor 13, of the device of Fig. 2. A grooved cable drum 64 is secured to the shaft 15' and has a small actuating cable 65, formed of fine braided wire wound thereon, with one end of the cable secured to the drum. The cable 65 passes over a small guide pulley 66, mounted in jewelled, or other antifriction bearings (not shown) in a cap 68, rotatably mounted on a ball bearing 69 secured on the upper end of a hollow tubular stem 70, having a bell mouthed lower end fitting over the end of the hollow shaft 51 and forming an extension of the shaft (see Fig. 4A). The cable 65 passes over the pulley 66 so as to be concentric with the axis of stem 70 and hollow shaft 51 and passing through the stem and hollow shaft, it passes over a pulley 71 similar to pulley 66 and mounted on the channel 52. The cable 65, then extends within the channel 52 and connects with a stem 72, rigidly mounted on the frame of the course recorder 45. The stem 72 projects within the open portion of the channel 52 and is provided with an antifriction contact means 73 (see Fig. 4B), so that the stem may transmit movement of the recorder 45 to the channel 52, due to the contact of the stem with the side members of the channel.

The operation of the device of Figs. 3 and 4, in conjunction with the signalling system of Fig. 2 is as follows: The aviation ground trainer 46 is placed in operation and the course recorder set in operation with the stem 72 connected to cable 65 and in contact with the side walls of channel 52. The channel 52 must be initially adjusted so that when it is parallel and coplanar with one pair $R_1$—$R_3$ or $R_2$—$R_4$ of the ninety degree "On course" signal legs of the radio range map, the potentiometer will be in the "on" position (see Fig. 3). With the signalling system of Fig. 2 in operation, as seen in Fig. 3, as long as the recorder 45 moves along an "On course" signal leg toward the simulated range transmission station, the channel arm 52 will remain parallel and coplanar with the radio range leg and the potentiometer 27 will remain in the "on" position and the student in the trainer cockpit will hear the continuous "On course" signal in the headphones 38. If for example, the recorder should move into the lower right hand or N quadrant, as seen in Fig. 3, the channel member or arm 52 will be rotated clockwise, causing rotation of gear 53 and gear 54, which through pin 56 will cause counter-clockwise rotation of arm 58 and gear sector 60, causing clockwise rotation of gear 62, which will rotate the shaft 32, of the potentiometer 27, into the N position (Figs. 2 and 3) and the student will hear the "N" signal. If the recorder moves into the upper right hand or A quadrant, the potentiometer 27, by a similar procedure will be placed in the "A" signal position. Rotation of the arm 52 through an angle of ninety degrees from one range leg position to another will cause gear 54 to rotate through one hundred and eighty degrees, so that the potentiometer 27 will again be in the proper "on" or "On course" signal position. By suitable selection of the ratio between gear sector 60 and gear 62, the proper angular extent of the "On course" signal may be adjusted.

It is thus seen that no matter what the position of the recorder on the map surface, the proper "A," "N" or "On course" signal will be given to the student and by careful design in reducing friction to a minimum, the recorder will be enabled to actuate the arm when located at very small radial distances from the axis of rotation of shaft 51.

The signal volume is accurately controlled so as to cause increasing signal strength as the recorder approaches the simulated range station on the record map, since the recorder as it moves radially inward or outerward (see Fig. 4), relative to the assumed radio range station, causes the cable 65 to actuate the potentiometer 15, thus controlling signal volume in proportion to the distance from the axis of shaft 51 and the assumed range station location on the record map. As the recorder moves radially inward the cable 65 becomes slack and the hairspring 63 then rotates the cable drum 64 and shaft 15' to actuate the potentiometer 15 to decrease the resistance in the audio oscillator lead 13 (Fig. 2), causing an increase in signal volume as the axis of rotation of shaft 51 and the assumed range station is approached. Radial movement of the recorder outward, with respect to the axis of shaft 51, will similarly cause cable 65 to actuate the potentiometer 15, to increase the resistance in the audio oscillator output circuit and cause a decrease in signal volume.

In order to simulate the cone of silence zone at the radio range station, a small switch 75 is placed in the surface of the record table, so that it will be contacted by the marker wheel of the course recorder 45, when passing over the radio range cone of silence zone, and the switch 75 may control a switch motor 76, having a suitable time delay in one direction of movement to open a switch 77 inserted in the filament heater circuit F of the signal system of Fig. 2, thus gradually cutting off the radio range signals completely for the small time necessary for the recorder to traverse the simulated cone of silence and then causing a gradual build-up of signal volume when switch 77 closes. The switch 77 is normally closed and is opened by the switch motor 76 and held open for the small time determined by the time delay means (not shown) associated with the switch motor 76, such time delay devices being well-known in the art.

The above described mechanical means for actuating the radio range signalling system signal and volume controls, by the course indicator, is adapted for use only in conjunction with a simulated radio range, having "On course" signal legs, spaced at ninety degrees with respect to each other, as indicated in Fig. 3 and in order to use the mechanical actuation of the signal control, where the "On course" signal legs have angular spacing other than ninety degrees, a modified form of signal control is illustrated in Figs. 5 and 6 and all parts common to the device of Figs. 3 and 4 are given the same reference numerals as employed in Figs. 2, 3 and 4.

As seen in Figs. 5 and 6, the only structural difference from the device of Figs. 3 and 4, lies in the means for transferring motion from the channel member 52' and shaft 51, to the arm 58. As seen in Fig. 5, the radio range "On course" signal legs do not all form ninety degree angles with each other, but the crankpin 56 must rotate one hundred and eighty degrees for rotation of channel 52', from a position of alignment with one signal leg, to the other, so as to give the proper signal. To provide for such a motion a gear assembly generally indicated by the reference numeral 80 is mounted on the shaft 51 and comprises gear sectors 81, 83, 85 and 87, respectively, which mesh with gears 82, 84, 86 and 88, respectively. As shown in Fig. 5, the angle between the "On course" signal legs $R_1$ and $R_2$ is ninety degrees, between $R_2$ and $R_3$ sixty degrees, between $R_3$ and $R_4$ one hundred and ten degrees and between $R_4$ and $R_1$ one hundred degrees. The included angle of gear sector 87 is made sixty degrees and the ratio between gear 88 and gear sector 87 is made the same as the ratio of 180° to 60°, or 3:1, so that when gear sector 87 revolves through an angle of sixty degrees, gear 88 revolves through an angle of one hundred and eighty degrees. The included angle of the respective gear sectors 85, 83 and 81 are made ninety, one hundred and one hundred ten degrees respectively and the gear ratio between the gears 86, 84 and 82, with the sectors 85, 83 and 81 respectively, are made 2:1, 1.8:1 and 1.6:1 respectively. Where the gear ratios give impossible, or impractical numbers of gear teeth, the nearest practical number of teeth can be used with but little error and to prevent more than one sector being engaged one or more teeth on each sector can be removed. The rotation of arm 52' to the left, or clockwise, as seen in Fig. 5, causes the arm to move from range leg $R_1$ to range leg $R_2$, or ninety degrees and gear sector 85 will revolve gear 86 through an angle of one hundred eighty degrees and movement of gear 86 will cause the crankpin 56 to rotate arm 58, to cause the gear sector 60 to rotate gear 62 to move potentiometer 27 from the "on" position to the A position and then back to the "on" position as the leg $R_2$ is approached. Continued clockwise rotation of arm 52', from leg $R_2$ to leg $R_3$ through an angle of sixty degrees, causes gear sector 87 to mesh with gear 88 and rotate gear 88 a further one hundred and eighty degrees, causing potentiometer 27 to be adjusted to the N position and back to the "on" position. The potentiometer 27 will similarly be adjusted to the A position, in going from legs $R_3$ to $R_4$, through the angle of one hundred ten degrees, due to meshing of gear sector 81, with gear 82 and to give the proper "N" signal adjustment, when going from leg $R_4$ to leg $R_1$, due to the meshing of gear sector 83 with gear 84. The gears 82, 84, 86 and 88 are formed integral with a bushing 89 and rotate as a unit on the spindle 55 and the crankpin 56 is secured to gear 88 and cooperates with the guide slot 57, in the lever 58, in the same manner as in the device of Figs. 3 and 4.

By suitably cutting different sets of gears 82, etc. and gear sectors 81, etc. practically any radio range may be duplicated, the only limitation on the angles being, that of course, the gear ratios must be such that whole numbers of teeth will result.

The channel 52', as noted in Fig. 6, is only one-half the length of the corresponding channel 52, of the device of Figs. 3 and 4, due to the fact that the range legs are not at ninety degree angles with respect to each other and for proper operation, when the course recorder 45, is in the cone of silence, the instructor must rotate the arm 52' through an angle of one hundred eighty degrees from its instant position, so that the proper radio range signal will be given when the recorder emerges from the cone of silence zone. As seen in Fig. 6, however, a power means controlled by the recorder 45 may be employed and comprises, an electric motor 91 connected to the lower end of the shaft 51 by means of the gears 92 and 93 carried by the shaft 51 and the armature shaft of the motor 91 respectively. A commutator device 94 controls the rotation of motor 91 so that the motor 91 rotates the arm 52' and shaft 51 through an angle of one hundred and eighty degrees from its instant position, whenever switch 75 is closed by the marker wheel of the recorder 45. The commutator is electrically connected to slip rings 95 and 95' which are electrically connected in a switch control circuit illustrated in Fig. 6A.

As seen in Fig. 6A, the commutator assembly 94 comprises a pair of commutator bars 96 and 96', connected respectively to slip rings 95 and 95'. The commutator bars rotate with shaft 51 and have their open spaces aligned with the longitudinal axis of channel member 52'. A brush 97 is mounted in a commutator housing and adapted to be positioned in the plane of the "On course" signal leg of the chart to be used in homing to the range station point and contacts one of the commutator bars 96 or 96'. The commutator bar 96' connects to the coil of a solenoid switch S', the switch contacts 98', of which, are connected to one terminal of a battery 99. The commutator bar 96 is connected to the coil of a solenoid switch S, the switch contacts 98, of which, are also connected to the same terminal of battery 99, as the solenoid switch 98'. The other ends of the solenoid coils are connected in series with each other and each terminal is also connected to a respective one of the switch contacts 98 and 98'. The switch 75, such as shown in Fig. 4, is shunted across the switch 98. The other terminal of the battery 99 is connected to the motor 91, which in turn is connected to the brush 97.

In operation the brush 97 will always be in contact with one of the bars 96 or 96'. If it is assumed that the parts of Fig. 6A are such that brush 97 just contacts bar 96' when the channel 52' is aligned with the desired "On course" signal leg, then when switch 75 is closed a circuit will be established from the battery 99 through solenoid coil S', bar 96' and brush 97 to the motor 91 causing the same to start driving shaft 51 and arm 52'. When brush 97 engages contact bar 96 the solenoid S' will be deenergized and its switch 98' opened while solenoid S will be energized closing switch 98 which will cause the solenoid to remain energized even if switch 75 is thereafter opened. A circuit is then again established to the motor 91 which will continue to operate until brush 97 passes over the next dead spot causing solenoid S to drop out and the motor 91 to become deenergized. The motor 91 during its cycle of operation will have rotated the shaft 51 through 180°.

If the brush 97 is initially in contact with commutator bar 96, solenoid coil S will be energized upon closure of switch 75, and its contacts 98 will close to form a holding coil to keep the motor 91 energized either through 180° of rotation of shaft 51 or until a dead spot is passed and solenoid S' becomes effective as a holding coil. It thus makes no difference which bar 96 or 96' is in contact initially with brush 97 since a circuit can be established to run motor 91 in the same direction through either solenoid and either can act as a holding coil. It is only necessary that switch 75 be closed for the brief period necessary for motor 91 to rotate the commutator through the width of a dead spot space. Since the width of an "On course" signal zone on the radio range chart is very narrow at the point of intersection with the cone of silence, the channel member 52' will always be in close alignment with the axis of the selected "On course" signal leg when the recorder crosses the cone of silence zone and closes switch 75. In order to obviate any possible failure of motor 91 to operate due to exact coincidence of one of the commutator dead spots with brush 97, the brush should have a width only slightly less than the width of a dead spot and preferably be set slightly off from the position of exact alignment with the axis of the selected "On Course" signal leg to insure contact with one of the commutator bars 96 or 96'. The particular motor operating circuit disclosed is not per se novel and other known forms of circuits are equally well adapted for the purpose.

The motor control switch 75 is of the two circuit variety and simultaneously controls cutoff of signal to simulate the cone of silence zone, as above described, with reference to Figs. 3 and 4. The motor 91 is used in modification Figs. 9 and 10, when employing the potentiometer constructions of Figs. 11 and 12 in simulating unequal angle radio ranges.

The switch 75 controls the motor 76 and filament switch 77 in the same manner as above described with reference to the device illustrated in Figs. 3 and 4, and the stem 72 of the recorder 45 actuates the arm 52' and the volume control cable 65 in the same manner as above described with reference to the device of Figs. 3 and 4. The volume control potentiometer 15 is identical with that illustrated in Figs. 2, 3 and 4 and is similarly operated.

Figs. 7 and 8 illustrate a modified form of signal controlling potentiometer 27' and an actuating means therefore, similar to the device illustrated in Figs. 3 and 4. The frame 48, gears 53 and 54, channel 52 and volume control potentiometer 15 and its actuating means are arranged in a manner identical to the device of Figs. 3 and 4, and all similar parts are given the same reference numerals as in Figs. 3 and 4. The potentiometer 27' comprises two parallel resistances 28' and 29' wound on suitable rectangular insulating strips mounted on the spaced supports 100 secured to the frame 48. The supports 100 each have a guide boss 101, formed therein, which serve as guides for the guide rod 102 reciprocable therein. The guide rod 102 is arranged between the resistances 28' and 29' and carries a slotted link 103 arranged transverse to the axis of the guide rod 102. The slotted link 103 has a slot 104 within which a pin 105 may slide the pin 105 being mounted on the end of an arm 106, fixed by pins 107 at its inner end to gear 54 with which the arm rotates. Rotation of the gear 54 causes pin 105 to reciprocate the guide rod 102. The slotted link 103, (Fig. 8) carries immediately beneath the resistances 28' and 29' a pair of light spring contact strips 30' and 31', insulated therefrom and each strip engaging one of the resistances 28' or 29' on the lower surface thereof, with a minimum of frictional resistance. The resistances 28' and 29' and contacts 30' and 31' are connected in a signal circuit of the type illustrated in Fig. 2, in exactly the same manner as the resistances 28 and 29 and the contacts 30 and 31 of Fig. 2 and the "A," "N" and "On course" signal positions are as indicated in Fig. 3. The device as described with reference to Figs. 7 and 8 operates in exactly the same manner as above described with reference to Figs. 3 and 4, but the reduction of the number of gears necessary to operate the signal controlling potentiometer 27' decreases friction and increases sensitive action, when the recorder 45 approaches the cone of silence zone on the radio range map. The volume control 15 and zone of silence control switch 75 operate in the same manner as above described with reference to Figs. 3 and 4.

The spring contacts 30' and 31' may incorporate rollers if so desired, to further reduce friction.

The potentiometer 27' and its actuating mechanism as illustrated in Figs. 7 and 8, is equally well adapted for use with the device illustrated in Figs. 5 and 6 where the radio range, "On course" signal legs, are arranged at angles differing from ninety degrees.

Figs. 9 and 10 illustrate a mechanical device for actuating the signal control system of Fig. 2, without the necessity of using gearing, with its attendant friction. The frame 48, arm 52 and shaft 51 are the same as shown in Figs. 3 and 4, but the signal control potentiometer 27 of Figs. 2, 3 and 4, is replaced as seen in Fig. 9, by two separate potentiometers 120 and 121, respectively, having their resistance windings 122 and 123, respectively arranged concentric with the axis of shaft 51 and supported by a bracket 124. A sleeve 125 of insulating material is secured to the hollow shaft 51 and is rotatable therewith and carries the contact arms 126 and 127 which have wiping contact respectively with the resistances 122 and 123. The sleeve 125 carries at its lower end a pair of slip rings 128 and 129 connected to the contact arms 126 and 127 respectively and engaged by brushes 130 and 131, respectively. The brush 130 is connected to the grid lead 33 of the "A" signal amplifier tube 40 of Fig. 2 and the brush 131 is connected to the lead 34, of the "N" signal amplifier tube 40 of Fig. 2. The resistance windings 122 and 123 are illustrated in Fig. 10 schematically, as being of unequal diameter for purposes of illustration, while the diameters are actually equal as shown in Fig. 9. As seen in Fig. 10, the radio range "On course" signal legs are illustrated as being ninety degrees apart and the resistance winding 122 is tapped at points B, on a line at forty-five degrees to the range leg axis and the tapped points grounded to the negative terminal of the power supply unit of Fig. 2. The "N" signal output-connection 26 of Fig. 2 is branched and connected at points C, on a line angularly spaced at ninety degrees from points B. The resistance winding 123 is similarly tapped and grounded to the negative terminal of the power supply at diametrically opposite points D, which fall on the line through points C. The "A" signal output connection 25, of Fig. 2, is branched and connected at diametrically opposite points E, which fall on the line through points B.

When the channel 52' and contact arms 126 and 127 and recorder 45, are in the position shown in Fig. 9 the "N" signal output, from the audio oscillator 12, of Fig. 2, passes through conductor 26, to the resistance 122, at its tapped point C and then through contact arm 127, to slip ring 129, brush 131 and lead 34, to the grid of the "N" signal amplifier tube 41, of Fig. 2 and as shown, no resistance will be in series with the circuit for the "N" signal. The lead 25, carrying the "A" signal, will carry the signal current in to resistance 123, at lower point E and traversing the resistance 123 between points E and D, will be carried by the contact arm 126, to slip ring 128, brush 130 and lead 33, to the grid of the "A" signal amplifier tube 40. The high resistance in series with the grid of tube 40 will practically suppress the "A" signal and the "N" signal will be heard. As the arm 52 is rotated further in a clockwise direction, the resistance in series with the "A" signal tube 40 will decrease and the resistance in series with the "N" signal tube 41 will increase bringing the "A" signal up to equal intensity with the "N" signal when range leg $R_4$ is reached, thus giving the proper "On course," continuous signal. As the arm 52 rotates into the different quadrants, the proper signal will always be given, depending on what quadrant the recorder 45 and arm 52, happen to be located. The signal volume potentiometer 15 is controlled in the same manner as above described with reference to Figs. 3 and 4 and the arm 52 is transposed 180° by motor 91 when the recorder 45 actuates switch 75, as in the modification Figs. 5 and 6.

Fig. 11 illustrates schematically, the arrangement of the potentiometer resistances 122 and 123 of the device of Figs. 9 and 10 in order to simulate a radio range having certain "On course" signal legs $R_1$, $R_2$, $R_3$, or $R_4$ arranged at angles differing from ninety degrees. The view is similar to that illustrated in Fig. 10 and similar parts are given the same reference numerals, as in the device of Fig. 10. For proper operation the resistances 122 and 123 must have portions extending equally on either side of the "On course" signal legs, so that the "A" and "N" signals will be of equal intensity when the resistor arms 126 and 127 are aligned with the "On course" signal legs on the radio range map, giving the familiar continuous signal. Since the signal zones are of unequal angular extent, the arcs DE and CB are chosen so that the range leg $R_4$ bisects the arcs and arcs ED' and BC' are arranged so that they are bisected by range leg $R_1$. The range legs $R_2$ and $R_3$ similarly bisect arcs D'E', C'B' and E'F, B'G respectively, leaving arcs FD and GC as unbalanced resistances and to eliminate the unbalanced condition, short circuiting strips 135 and 136 of a suitable low resistance material such as copper, are placed so as to contact the resistances 122 and 123 along arcs GC and FD respectively, short circuiting these sections. The selection of the various resistance zones is made by trial and hence the maximum A, or N signal positions will not lie on the bisectors of the included angles between the range legs, but the error introduced is of negligible extent since the maximum signal strength is seldom relied upon for positional information.

In the position 2—2, of the contact arms 126 and 127, as shown in Fig. 11, aligned with the range leg $R_4$, the "A" signal is fed from conductor 25 to point E of resistance 123, thence to contact arm 127 and conductor 33 to the grid of the "A" signal amplifier tube 40. The "N" signal is fed from conductor 26 to point C of resistance 122 and then to contact arm 126 and lead 34, to the grid of the "N" signal amplifier tube 41 and the resistances being equal, the continuous "On course" signal will be heard in the headphones.

If the arms 126 and 127 are rotated to the position 5—5, indicated in the lower left hand, or "N" signal quadrant, as seen in Fig. 11, the "A" signal current will pass from conductor 25 to point E' of resistor 123 and then from contact arm 127 to the "A" signal amplifier and the "N" signal current will pass from conductor 26 to point C' on resistance 122, to contact arm 126 and the "N" signal amplifier. The resistance inserted in the grid circuit of the "A" signal amplifier tube 40, of Fig. 2, will greatly exceed the resistance inserted in the grid circuit of the "N" signal amplifier tube 41 and consequently the "N" signal will predominate. By assuming different positions of the resistor contact arms as indicated by the arrows from position 1—1, to position 11—11, the circuits can be traced in the manner described and it will be seen that the proper "A," "N," or "On course" signal will be given depending on the location of the resistor contact arms 126 and 127 as determined by the movement of arm 52 by the recorder 45. The device of Fig. 11, has the advantage, that uniformly wound resistance units 122 and 123 may be used.

Fig. 12 illustrates another and preferred arrangement of the resistances 122 and 123, of the device of Figs. 9 and 10, in order to simulate a radio range having certain "On course" signal legs $R_1$, $R_2$, $R_3$, or $R_4$ arranged at angles other than ninety degrees and in which the maximum A, or N signal position will occur on the lines bisecting the included angles between the "On course" signal legs. The resistances 122 and 123 are made so that the amount of resistance between legs $R_4$ and $R_1$, $R_1$ and $R_2$, $R_2$ and $R_3$, and $R_3$ and $R_4$, are equal and say 7000 ohms per zone. The connections of the A signal output leads 25 to the resistance 123, at points E and $E_1$, are made on the bisectors of the angles between range legs $R_4$ and $R_1$ and $R_2$ and $R_3$ respectively. The connections of the "N" signal output lead 25 and the various grounded connections are also made at points C—C', D—D', etc., along the lines bisecting the included angles between the range legs. By tracing the circuits as above described with reference to Figs. 9, 10 and 11, it will be seen that the proper "A," or "N" signal will be given in the respective quadrants as indicated, and the "On course" continuous signal will be given when the resistor contact arms 126 and 127 are aligned with the "On course" signal legs $R_1$, $R_2$, etc., as indicated in Fig. 12. The maximum "A" or "N" signal intensity, will occur at positions of the resistor contact arms 126 and 127, coinciding with the lines bisecting the included angles between the radio range "On course" signal legs $R_1$, $R_2$, etc.

In using the potentiometer arrangements illustrated in Figs. 11 and 12, in conjunction with the device illustrated in Figs. 9 and 10, a separate set of units may be made up for each radio range to be duplicated, although the arrangement of Fig. 11, may be made by simply altering the position of the various connections and using the short circuiting strips of the proper length.

The electric motor 91, is employed to rotate the arm 52', when the recorder 45 actuates the switch 75 in the cone of silence zone, to transpose the arm 52' through an angle of 180° from its instant position, in the same manner as in the device of Figs. 5, 6, 9 and 10 and the volume control potentiometer 15 is actuated in the same manner as illustrated in Figs. 9 and 10.

While several modifications of the invention have been illustrated in the drawings, other modifications falling within the scope of the invention as defined by the appended claims will be apparent to those skilled in the art.

I claim:

1. In an aviation ground training system for training in flying by radio comprising, an aviation ground trainer for simulating the flight of an aircraft, a reference surface, a course indicator movable relative to said reference surface at a velocity proportional to the simulated velocity in flight of said aircraft and directionally controlled by said trainer, means for generating positional signals of varying character simulating "radio range" signals, control means for said signal generating means, signal receiving means mounted in said trainer and connected to said signal generating means and a mechanical connection between said signal generator control means and said course indicator for actuating said signal generator control means in response to the position of said course indicator relative to said reference surface, whereby said signal generator transmits signals to said signal receiver of a character indicative of the position of said course indicator relative to zonal areas on said reference surface representing a predetermined radio range pattern.

2. The structure as claimed in claim 1, in which the mechanical means for actuating the signal generator control means is a pivoted arm the pivotal axis of which coincides with an assumed "radio range" transmitting station point on said reference surface and the course indicator being connected to said arm in a manner such that said course indicator may impart rotation to said arm about said pivotal axis and have a free movement relative to the longitudinal axis of said arm.

3. The structure as claimed in claim 1, in which the mechanical means for actuating said signal generator control means is a pivoted arm the pivotal axis of which coincides with an assumed radio range transmitting station point on said reference surface and the course indicator being connected to said arm by a connection allowing free movement of said course indicator relative to the longitudinal axis of said arm, a volume control means on said signal generator and a connection between said volume control means and said course indicator responsive to longitudinal movement of said course indicator relative to said arm.

4. In combination, an aviation ground trainer for simulating the flight of an aircraft, a reference surface, a course indicator movable relative to said reference surface under the directional control of said trainer in a manner equivalent to the simulated flight course of said aircraft, a signal generator for generating signals simulating the signals of a "radio range" transmitting station, a signal receiver connected to said signal generator and mounted in the cockpit of said trainer, a control means for said signal generator for controlling the character of positional signals transmitted to said signal receiver, a means operatively connected to said course indicator and said signal control means for actuating said control means responsive to the position of said course indicator relative to predetermined zones on said reference surface representing a radio range signal pattern, signal volume control means on said signal generator and means for actuating said signal volume control means responsive to the position of said course indicator relative to an assumed "radio range" transmitter station point on said reference surface.

5. In combination, an aviation ground trainer for simulating the flight of an aircraft, a reference surface, a course indicator movable relative to said reference surface under the directional control of said trainer in a manner equivalent to the simulated flight course of said aircraft, a signal generator for generating signals simulating the signals of a "radio range" transmitting station, a signal receiver connected to said signal generator and mounted in the cockpit of said trainer, a control means for said signal generator for controlling the character of positional signals transmitted to said signal receiver and a means operatively connected to said course indicator and to said control means for actuating said control means responsive to the position of said course indicator relative to predetermined zones on said reference surface representing a radio range signal pattern.

6. The structure as claimed in claim 5, in which the signal generator control means is actuated by a rotatable arm secured thereto and connected to said course indicator for rotation thereby in accordance with the position of said course indicator relative to said reference surface zones, the connection between said arm and said course indicator permitting sliding movement of said course indicator relative to the longitudinal axis of said arm.

7. The structure as claimed in claim 5, in which the signal generator control means is actuated by a pivoted arm the pivotal axis of which coincides with the position of an assumed "radio range" station point on said reference surface, a connection between said arm and said course indicator allowing free radial movement of said course indicator relative to the pivotal axis of said arm and a geared connection between said arm and said signal generator control means.

8. The structure as claimed in claim 5, in which the signal generator control means is actuated by a pivoted arm the pivotal axis of which coincides with the position of an assumed "radio range" station point on said reference surface, a connection between said arm and said course indicator allowing free radial movement of said course indicator relative to the pivotal axis of said arm and a connection between said arm and said signal generator control means including multiple ratio gearing for actuating said signal control means through a predetermined cycle of positions irrespective of the angular extent of said predetermined zones on the reference surface.

9. The structure as claimed in claim 5, in which the signal generator control means is actuated by a pivoted arm the pivotal axis of which coincides with the position of an assumed "radio range" station point on said reference surface, a connection between said arm and said course indicator allowing free radial movement of said course indicator relative to the pivotal axis of said arm, a connection between said arm and said signal generator control means for actuating said signal generator control means through a predetermined cycle for given angular rotations of said arm about said pivotal axis corresponding to said zones on the reference surface and power means controlled by said course indicator when in a predetermined position relative to said pivotal axis for rotating said pivoted arm through an angle of one hundred and eighty degrees from its instant position.

10. The structure as claimed in claim 5, in which means actuated by said course indicator are provided for varying the volume of signals transmitted to said signal receiver in accordance with the radial distance of said course indicator from a point on said reference surface representing the location of an assumed "radio range" transmitting station.

11. The structure as claimed in claim 5, in which means are provided for gradually decreasing the volume of signals transmitted to said receiver to zero volume as the course indicator traverses a predetermined zone of silence symmetrically disposed about an assumed "radio range" transmitting station point on said reference surface and actuated by said course indicator.

12. In a signalling system for simulating "radio range" signals in an aviation ground training system, a reference surface, a course indicator movable relative to said reference surface in a manner equivalent to the simulated flight of an aircraft, an electrical signal generator for generating simulated "radio range" signals, a signal receiver connected to said signal generator, a control means for said signal generator including a potentiometer having a pair of resistance windings symmetrically disposed with respect to the axis of a common shaft for respectively controlling the volume of one of two successive signals generated by said signal generator, each of said windings being formed in a plurality of sections equal in number and angular extent to the signal zones of a predetermined assumed "radio range" signal pattern charted on said reference surface and only one of said sections of each winding being operative at any one time and the resistance of all sections of each winding being equal irrespective of its angular extent, contact means rotatable by said common shaft for engaging each resistance winding, an arm secured to said shaft for rotating the same through the different signal zone positions and a connection between said arm and said course indicator for causing rotation of said arm and shaft in accordance with changes in position of said course indicator said connection permitting free radial movement of said course indicator with respect to said shaft.

13. The structure as claimed in claim 12, in which are provided a power means for rotating said arm through an angle of one hundred and eighty degrees from its instant position, control means for said power means and means for actuating said last named control means operatively controlled by said course indicator in a predetermined position of said course indicator relative to an assumed "radio" station point on said reference surface coincident with the axis of said shaft.

14. In combination, an aviation ground trainer for simulating the flight of an aircraft, a reference surface, a course indicator movable relative to said reference surface at a velocity proportional to the simulated velocity in flight of said aircraft and directionally controlled by said trainer, a signal generator for generating positional signals, means connected to said signal generator for translating the signals transmitted by said signal generator into positional information, a control means for said signal generator, said control means being operatively connected and responsive to change in position of said course indicator relative to a point on said reference surface.

CARL W. MULLER.

REFERENCES CITED

The following references are of record in the file of this patent:

UNITED STATES PATENTS

| Number | Name | Date |
|---|---|---|
| 1,825,462 | Link | Sept. 29, 1931 |
| 2,099,857 | Link | Nov. 23, 1937 |
| 2,110,869 | Crane | Mar. 15, 1938 |
| 2,164,412 | Koster | July 4, 1939 |
| 2,179,663 | Link | Nov. 14, 1939 |
| 2,226,726 | Kramer | Dec. 31, 1940 |